(12) United States Patent
Wahl

(10) Patent No.: US 6,452,893 B1
(45) Date of Patent: Sep. 17, 2002

(54) CD CHANGING METHOD AND APPARATUS

(75) Inventor: Mark A Wahl, Windsor, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/489,780

(22) Filed: Jan. 24, 2000

(51) Int. Cl.[7] .............................................. G11B 17/04
(52) U.S. Cl. ......................... 369/178; 369/36; 369/191
(58) Field of Search ................................ 369/178, 176, 369/34, 36, 191, 192

(56) References Cited

U.S. PATENT DOCUMENTS

| | | | | |
|---|---|---|---|---|
| 5,282,183 A | * | 1/1994 | Arifuku et al. | 369/191 |
| 5,751,687 A | * | 5/1998 | Ariyoshi et al. | 360/92 |
| 5,841,744 A | * | 11/1998 | Menke et al. | 360/98.06 |
| 6,222,800 B1 | * | 4/2001 | Miller et al. | 369/30.19 |

* cited by examiner

Primary Examiner—David Hudspeth
Assistant Examiner—Angel Castro

(57) ABSTRACT

A CD changing method (and drive for carrying out said method) enables information stored on an information-containing CD to be transferred to a blank space-containing CD in order to duplicate the information on said information-containing CD without a human having to be in attendance in order to manually remove the information-carrying CD from a CD transport tray and then replace said information-containing CD with a blank space-containing CD.

17 Claims, 4 Drawing Sheets

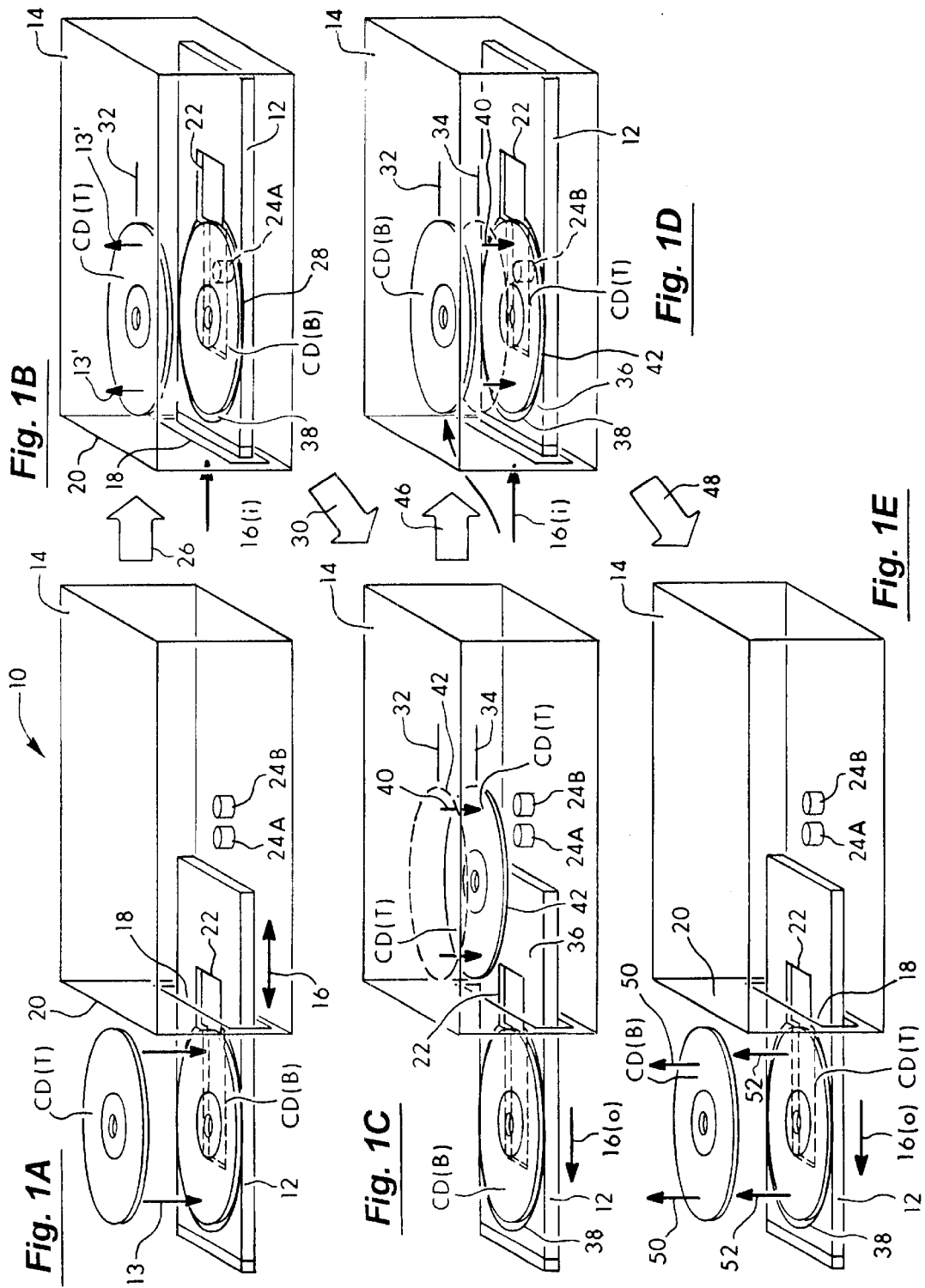

CD CHANGING METHOD AND APPARATUS

BACKGROUND OF THE INVENTION

1. Field of the Invention

In the operation of a compact disk drive ("drive"), a printed circuit board receives commands from the drive's controller which, in turn, is managed by an operating program. The printed circuit board translates those commands into voltage fluctuations that move a read (or write) head across a surface region of a compact disk ("CD"), e.g., across its bottom surface. The printed circuit board also tells the drive when to read from, and when to write to, the disk. These operations are carried out by several different kinds of CD drives and disks. For example, CD-Recordable ("CD-R") drives can write data to a recordable compact disk containing portions that have permanently inscribed data (which can not be written upon or deleted) and portions that can accept writing (but which can not thereafter be changed or deleted). Drives for so-called rewriteable CD-ROMs ("CD-RW") are characterized by the fact that they are capable of receiving writing upon (and erasing writing from) virtually the entire working surfaces of the CD-RW. Write-once, read-many (WORM) CDs also find various uses. DVD digital video disk (or digital versatile disk) drives are used with respect to video and/or audio generating information and useable data.

Various technologies are used to read from, and/or write to, appropriate compact disk types. For example, one such technology uses phase changes in a material out of which the media portion of such a disk is made. These phase changes enable a user to write, change, and erase data. This technology is frequently employed to write on and read from CD-RWs and DVDs. It does this by focusing a laser beam on a layer of media material (often made of silver, indium, antimony and tellurium) which has a polycrystalline chemical structure. The laser writes on the media material by selectively heating certain crystals to such an extent that they are changed into a non-crystalline or amorphous phase material. Those areas comprised of amorphous phase material reflect less light than the surrounding crystalline areas. Thus, when a weaker laser beam (used only to read data from such disks) strikes the non-crystalline area, the beam is scattered and not picked up by a light-sensitive diode in the drive's read head. With their lower reflectance, these areas become analogous to pits; representing 1s. Areas that are not heated constitute more reflective lands, representing 0s. When a read laser beam strikes the lands it is reflected directly to a diode, creating an electrical current that is sent to a computer. A computer interprets the pattern of electrical pulses, decompresses the data they represent, and sends the data to the software. In order to erase data or to change a pit back to a land, a process called "annealing" is employed. It involves the use of a lower-energy laser beam to heat pitted areas to about 400F degrees. This degree of heating is below the phase change medians melting point, but it still is powerful enough to loosen the media material enough that it naturally recrystallizes to its original crystalline state.

The writing capabilities provided by such technologies has intensified the need for copying or duplicating compact disks. This copying or duplicating is usually carried out in one of two general ways. The first general way is decidedly "manual" in nature. It involves manually loading and unloading compact disks from the drive's CD disk transport tray. In order to perform these operations, the tray is moved laterally from a fully closed position (such that a CD on the tray is inside the drive) to a fully open position (such that a CD on the tray is outside the drive). In the tray's fully opened position, a compact disk is exposed for manual removal from, or placement upon, the CD transport tray. A mechanical transmission provides the lateral motion of the CD transport tray as it travels back and forth between its fully open position and its fully closed position. In the tray's fully closed position, data stored on a CD can be read by the drive's read head—or a blank portion of a CD can be written upon through use of a writing technology such as the focused laser beam/phase change media material technology described above.

A very commonly used CD duplicating operation is one wherein a data-carrying, first CD is manually placed on a transport tray and loaded into the drive. After the data on said first CD has been read and stored, the tray is again moved to its full outward position. The data-carrying, first CD is then manually removed from the tray. The user then manually loads a second, blank space-containing CD on the CD transport tray. Upon the user's command, the blank CD is then transported (on the tray) into the drive. Thereafter, the data taken from the first CD (and stored in a hard drive) is written upon the second CD. Thus, the information contained on the first CD is duplicated by copying it on the second CD.

The primary problem with this method of duplicating the first CD is that the user must be physically present in order to manually exchange the first, data-carrying, CD for the second, blank CD after the information on the first CD has been read and stored. Since the user does not always know how long the reading of the first CD may take, a great deal of time can be wasted in simply awaiting completion of these reading and storing processes. This represents a particularly irksome problem when a user wishes to duplicate a disk in an "overnight" copying situation because the manual exchange of the two CDs will often be needed somewhere in the middle of the night when the user is not in attendance.

Such potential waste of a user's valuable time by simply having to wait around for a copying and storing operation to be finished has been met by providing drives with two CD transport tray systems. Thus, a first, data-carrying CD is simply placed in a first CD transport tray and a second, blank, CD is placed in a second CD transport tray. Both trays are then loaded into the drive so that the data on the first CD can be duplicated on the second CD. Given this capability, the user can load the two tray drives with the appropriate disks before leaving for the day and have the duplication process automatically completed when the user arrives next morning.

2. Statement of the Problem

These two transport tray drive systems address the human attendance problem associated with loading and unloading data carrying CDs and blank CDs into CD drives having only one CD transport tray. The problem is solved by duplicating the mechanical elements of the CD transport tray drive and the read/write heads associated with them—and by greatly increasing the complexity of the motherboard and controller components of the drive in order to properly coordinate not only physical movement of the trays, but the reading, storing and writing activities of the drive. These factors all contribute to a very significant increase in the cost of those drives that do employ two CD transport trays.

SUMMARY OF THE INVENTION

The present invention provides a method and apparatus for exchanging the positions of two CDs in a CD drive without having a human being taking part in the exchange process. Such a capability has several useful applications. For example, it can be used for copying information stored on a first CD on to a second CD without a human being having to unload the first CD from the drive and load the second CD into the drive—or without having to use a drive equipped with two separate disk transport trays. In one particularly preferred operational circumstance associated with this invention, two compact disks are stacked on a single CD disk transport tray, the tray (and the two CDs stacked on it) is inserted in a drive, the disks are separated within the drive, data is read from a first disk and stored in a hard drive, the first disk is transported out of the drive, the second disk is lowered, the first CD is inserted back into the drive such that the former positions of two CDs in the drive are exchanged, the data stored in the hard drive is written on the second disk and both CDs are transported out of the drive.

Another operating circumstance where this invention could be put to good use is one wherein a drive is loaded by placing two blank CD's on its transport tray so that the user can insert them and then write to both CDs (assuming the data to be written to the CDs is already on the computer's hard drive). Still another operating circumstance where this invention could be employed is one wherein two CDs that each already have data on them are loaded on a tray and inserted into a drive. Under these circumstances, the user could access data on either CD. This capability would, for example, be useful in the operating circumstance where the CD drive was at a remote location from the user. It also should be noted that this invention could be used in CD-ROM drives as well (read only—no write functionality). Moreover, by using the methods and apparatus of this invention in a CD server, the capacity of the server would be immediately doubled without needing to double the number of CD-ROMs in the server. In effect, the server would be a network server with many CD-ROM drives installed—all with data CDs in each drive—and thereby giving users of the network access to many more CDs.

One particularly preferred embodiment of this invention involves copying information from a data-carrying CD to a blank CD. Hence, this application will be used as a representative example of the CD position exchange concept of this invention. Such a CD exchange operation would comprise: (1) placing a first CD, having information on its underside, upon a CD transport tray (having an opening which permits the underside of the first CD to be in optical ("opto") and/or electromagnetic communication with an electromagnetic communication device contained in a CD drive); (2) stacking upon said first CD, a second CD having blank regions on its underside for receiving opto/ electromagnetic communication from the opto/ electromagnetic communication device in a CD drive; (3) inserting the CD transport tray (and hence the first and second CDs stacked upon it), into the CD drive; (4) separating the second CD from the first CD in the drive and holding the second CD in an upper position; (5) reading information from the underside of the first CD and storing said information on the device's (e.g., on a personal computer's) hard drive; (6) withdrawing the CD transport tray (and the first CD which rests upon it), out of the CD drive; (7) dropping the second CD to a lower position so that the first CD can occupy the upper position formerly occupied by the second CD; (8) placing the second CD on the CD tray in a position formerly occupied by the first CD when the tray is reinserted; (9) writing information read from the bottom of the first CD and stored in the CD drive on a blank region of the bottom surface of the second CD and (10) removing the two CDs from the transport tray. In one particularly preferred embodiment of this invention, after the information stored in the CD drive is copied on the second CD, the first CD is dropped on to the second CD in a stacked relationship so that the CD transport tray, and the second and first CDs resting upon it, are simultaneously transported out of the CD drive and then removed from said tray.

Aside from the known electrical and mechanical components used in such drive devices to control and move a single CD transport tray, the apparatus for exchanging the positions of the two CDs according to the teachings of this invention further comprise, a disk-separator, a top disk holder and a top disk lowering mechanism. More detailed descriptions (and drawings) of these devices (as well as their working relationship with the CD transport tray) will be given in subsequent parts of this patent disclosure.

BRIEF DESCRIPTION OF THE DRAWINGS

FIGS. 1A to 1E depict the CD exchange method of this patent disclosure.

DETAILED DESCRIPTION OF THE INVENTION

Figure 2A:
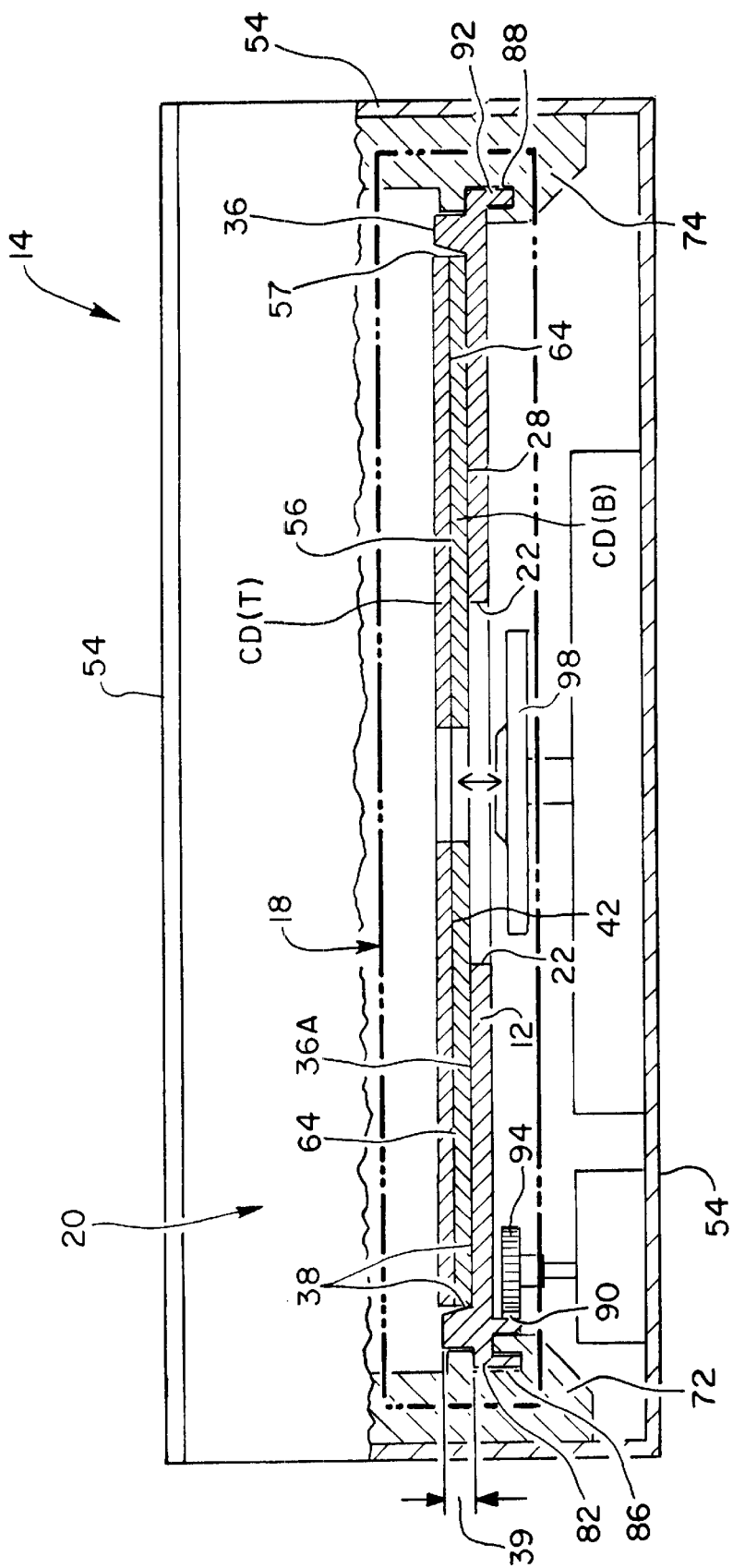
FIGS. 2A and 2B depict a preferred method for separating two stacked CDs from each other.

FIGS. 1A to 1E sequentially depict how the positions of two compact disks can be interchanged using a single CD transport tray and drive system 10. The CD types can vary. For example, they can be CD-Rs, CD-RWs, WORMs, DVDs or suitable combinations thereof such as, for example a CD-ROM that is "read from" and a CD-RW that is "written to". Be the CD types as they may, FIG. 1A depicts a top CD ("CD(T)") in a position above a bottom CD ("CD(B)") which rests on a CD transport tray 12. Direction arrow 13 indicates that CD(T) is to be placed (e.g., manually) in a stacked relationship upon CD(B) while the two CDs are outside of a CD drive 14 into which the two CDs are to be loaded. The bi-directional arrow 16 shown in FIG. 1A suggests that the CD transport tray 12 can be laterally inserted into, and withdrawn from, the CD drive 14 by changing the operating direction of a CD tray transmission (see FIGS. 2B and 3).

The CD's stacked relationship allows them, and the CD tray 12 upon which they rest, to be simultaneously loaded into the CD drive 14. FIG. 2A shows CD(T) and CD(B) in such a stacked relationship as the CD tray 12 begins to enter CD drive 14. The CD tray 12 comes to rest in either a fully extended position (such as that depicted in FIG. 1A) or a fully inserted position (such as that depicted in FIGS. 1B). This tray/disk insertion and exit into and out of the drive 14 is made via a slot or opening 18 in the front surface 20 of the drive 14 (see FIG. 1B). The CD tray 12 depicted in FIG. 1A is shown provided with an opening 22 that extends over a large part of the tray's surface area. Consequently, when the CD tray 12 is fully inserted into the CD drive 14, the opening 22 permits opto/electromagnetic communication device(s) 24A, 24B, etc. (e.g., laser beam reading and/or writing devices) to receive energy from (and transmit energy to) the underside of CD(B) as it rests upon the CD transport tray 12. Thus, such a electromagnetic communication device can, via opening 22, "read" data from (and/or "write" data to), the underside of a CD, e.g., CD(B), resting on the tray 12. For the purposes of this patent disclosure, such operations will be collectively referred to as "read/write" operation(s).

Figure 2B:
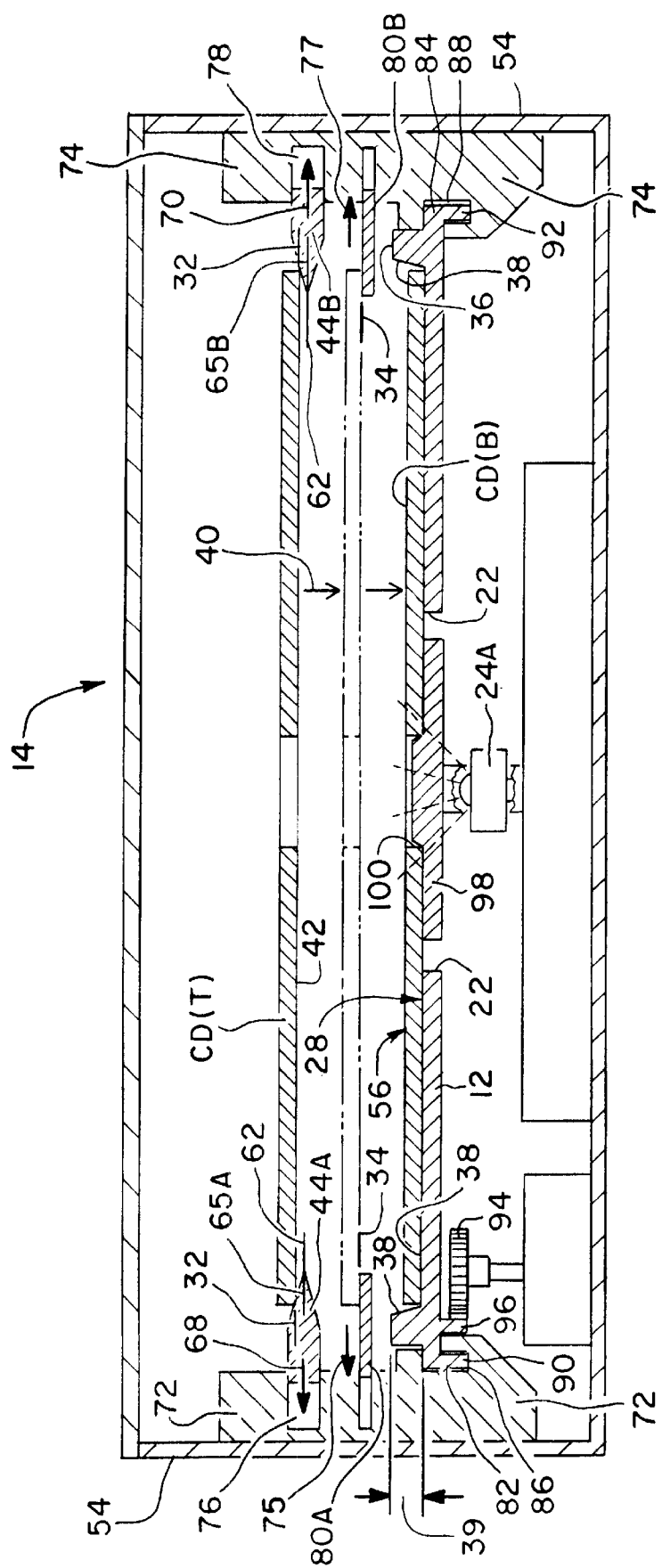

The direction arrow 26 shown leading from FIGS. 1A to 1B suggests a transition from an initial state of this CD changing method wherein the two CDs are first positioned in a stacked relationship (such as that shown in FIG. 2A) and then moved to a succeeding relationship wherein the two CDs are physically separated from each other (e.g., in the manner shown in FIGS. 1B and 2B). Thus, getting to the relationship depicted in FIG. 1B involves both driving the CD transport tray 12 in an inward direction 16(i) to an operating position in the drive 14 where information on the CD, e.g., on the bottom 28 of CD(B), can be read by an opto/electromagnetic communication device 24A, 24B, etc. and holding CD(T) in an elevated position above CD(B). The physical separation of CD(T) from CD(B) (such that the two CDs are no longer in their previous stacked relationship) is suggested by the upwardly directed arrows 13' in FIG. 1B. Thus, the separated relationship of the two CDs shown in FIG. 2B is comparable to the separated relationship shown in FIG. 1B.

Again, the CD exchanging method of this patent disclosure can be used in circumstances where both CDs are blank, or where both CDs contain data, but for purposes of illustration an example wherein one CD contains information and the other CD is blank will be used. In this example, after information on a first, data-carrying CD(B) has been read and stored, the CD changing operation would then proceed to its next sequential step. This is suggested by the direction arrow 30 leading from FIG. 1B to FIG. 1C. In FIG. 1C, the CD tray 12 is shown laterally transported out of the CD drive 14 in direction 16(o) to its full outwardly extended position (i.e., such that it extends out of the housing of the drive 14 far enough that any CD on the tray 12 is fully exposed for manual handling). CD(T), however, remains positioned in the drive 14 in the same elevated position 32 it occupied in FIG. 1B. It remains so positioned through use of a CD holding device hereinafter more fully described in the verbal descriptions associated with FIG. 2B.

The next step in the operating sequence of this patent disclosure is to transfer CD(B) to the elevated position 32 formerly occupied by CD(T) (again, see FIG. 1B) and to transfer CD(T) to the position on the tray 12 formerly occupied by CD(B). Again, this is the step that, under the manual CD changing operations of the prior art, requires the user to be in attendance when the first CD is transported (on tray 12) out of the drive 14 so that said first CD can be exchanged for a blank, second CD. Returning to the CD changing concept of the present invention, we next note that in order to make room for the incoming CD(B), CD(T) must fall from its elevated position 32 to either an intermediate position depicted in FIG. 1C by elevation line 34, or it may fall onto a portion of the top surface 36 of CD tray 12 and thereafter be driven into a CD-shaped depression 38 in the CD transport tray 12. Either mode of lowering CD(T) is generally depicted in FIG. 1C by downwardly directed arrow 40 leading from the bottom surface 42 of phantom CD(T) depicted in FIG. 1C. As can be seen in FIG. 2B, a CD holding ledge system, preferably formed by a CD separation device 44 (e.g., comprised of elements 44A and 44B), can be moved laterally and thereby allowing CD(T) to generally drop downward in the manner suggested by arrow 40 in FIG. 1C.

The transition from FIG. 1C to FIG. 1D suggested by arrow 46 results in the CD transport tray 12 again being driven in an inward direction 16(i) to its fully inserted or loaded position in the drive 14. In being so driven, CD(B) is forced (e.g., through the CD separating action of the CD separator device 44 shown in FIG. 2B) into the upper position 32 formerly occupied by CD(T). CD(T) is lowered into the position formerly occupied by CD(B). That is to say that CD (T) eventually is placed in the CD-shaped depression 38 in the tray 12. To facilitate the placement of the CDs in the CD-shaped depression 38 in tray 12, the CD-shaped depression has a diameter slightly larger than the diameter of the CDs that temporarily reside in it.

Thus, the positions of CD(T) and CD(B) are exchanged and CD(T) is now in a position such that a opto/electromagnetic communication device 24B (e.g., a laser writing device) can write upon blank regions of CD(T)'s bottom surface 42. For example, it can be written upon by use of a laser beam that, in the manner previously described, causes a media material on the bottom surface 42 of CD(T) to undergo a phase change from a material having a light-reflecting crystalline structure to an amorphous phase that does not reflect a "reader" laser beam as well. Be the writing technology as it may, the data that was read from the underside 28 of CD(B), and stored in a hard drive, is then written on the underside 42 of CD(T). This results in the data stored on the underside 28 of CD(B) being duplicated on the underside 42 of CD(T).

CD(T) can be removed from the drive 14 in any one of several ways. For example, it can be carried out of the drive 14 on the transport drive tray 12 while CD(B) remains in its upper position 32. After CD(T) is lifted from the transport drive tray 12, said tray 12 can be sent back into the drive 14 in order to retrieve CD(B). CD(B) can then drop onto the transport tray 12 and be removed. In a particularly preferred embodiment of this invention, however, after the information stored in the hard drive has been written on CD (T), CD (B) is lowered (e.g., by dropping it) into a stacked relationship with CD (T). Thus, both CDs can be simultaneously removed from the drive 14 on the transport tray 12. This lowering of CD(B) to rest upon CD(T) is depicted in FIG. 1D by downwardly directed arrow 40. Thus, CD (B) is again in a stacked relationship with CD(T) (albeit in exchanged positions) and, as such, is ready to be removed from the CD drive 14 via the slot 18 in its front face 20. Consequently, direction arrow 48 suggests a transition from FIG. 1D to FIG. 1E wherein the CD tray 12 is shown being moved in an outward direction 16(0) to such an extent that the two CDs are transported completely out of the drive device 14 when the tray 12 reaches its full outwardly extended position. In this position, both CD(B) and CD(T) can be raised in the upward direction depicted by arrows 50 and 52 in FIG. 1E. Thus, CD(B) can be separated (e.g., manually) from CD(T) and CD(T) can be separated (e.g., manually) from the CD shaped depression 38 in the CD transport tray 12 and thereby complete the overall CD copying operation.

FIG. 2A is a front, cross section view of a CD drive 14 having certain features needed to carry out the CD changing operation depicted in FIGS. 1A to I-E. The drive 14 has a housing 54 which physically positions and protects the drive's internal components. In FIG. 2A, CD(B) is shown resting upon the top surface 36A of the depression 38 of CD tray 12. The bottom surface 42 of CD(T), in turn, rests upon the top surface 56 of CD (B). The top surface 36A of the depression 38 is preferably far enough below the top surface 36 of the tray 12 that the entire thickness of CD(B) and at least a portion of the thickness of CD(T) lie in the depth 39 of the depression 38 in the tray 12. Thus, depression 38 serves to hold both CD(B) and CD(T) in a fixed location on the CD transport tray 12. In other words, in a preferred embodiment of this invention, a portion of the thickness of CD(T) may project above the top surface 36 of the tray 12.

Figure 3:
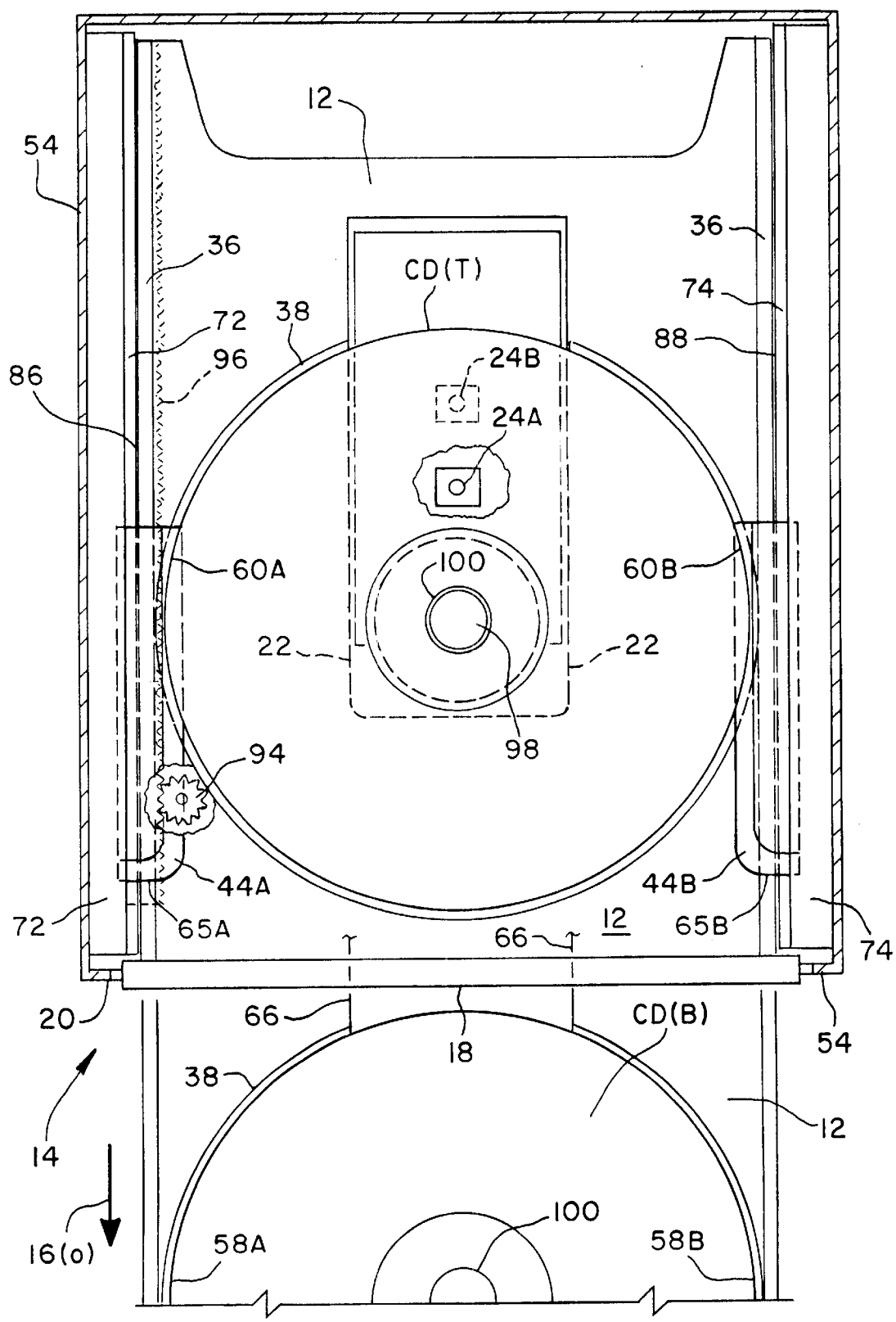
FIG. 3 is a plan view of the CD changing device depicted in FIG. 2B.

FIG. 2B shows that, as the two stacked disks, CD(T) and CD(B) are carried (on tray 12) into the drive 14, portions of the separator-encountering edges of the CDs (i.e., leading edge regions 58A and 58B of CD(B) and leading edge regions 60A and 60B of CD(T) shown in FIG. 3) encounter CD separator device(s). In FIG. 2B such a separator device is shown as being comprised of two components 44A and 44B. These CD separator devices 44A and 44B are vertically positioned at an elevation 62 such that the separator devices 44A and 44B make physical contact with the edges of the stacked CDs at their interface 64 (see FIG. 2A) and thereby separates them. That is to say that a leading edge (e.g., 65A and/or 65B as seen in FIG. 3) of the separator device is positioned at a vertical elevation 62 such that the separator device encounters the two stacked CDs at the elevation where the bottom surface 42 of CD(T) rests on the top surface 56 of CD(B) and thereby separates the two CDs by wedging them apart. The depression 38 in tray 12 can be provided with a beveled region 66 (shown in FIG. 3) to facilitate the CD/separator encounter at the interface 64 of the two stacked CDs.

FIG. 2B also illustrates how CD(T) can be held above CD(B) by use of two wedge-shaped separators 44A and 44B. Again, CD(T) could be held by a separate and distinct CD holder, but in a particularly preferred embodiment of this invention the top surface of the wedge-shaped separators 44A and 44B also serve as a support or holder for CD(T). In such an arrangement, the bottom surface 42 of CD(T) is shown resting on a top region of the separator wedges 44A and 44B at an elevation level or position 32 that also is depicted in FIGS. 1B to 1D.

Next, it should be noted that the directional arrows 68 and 70 respectively associated with wedges 44A and 44B in FIG. 2B depict a mechanical capability for laterally moving each of these two wedge-shaped separators 42A and 42B away from CD(T). Thus, if wedge 44A moves laterally far enough to the left in the manner suggested by arrow 68, and wedge 44B moves laterally far enough to the right in the manner suggested by arrow 70, CD(T) will be free to fall downward in direction 40 under the force of gravity. To this end, a left support member 72 and a right support member 74 are shown respectively attached to the left and right sides of the drive housing 54. These support members 72 and 74 are each provided with an opening 76 (or 78) for receiving its associated separator device (44A or 44B). Thus, separator device 44A can be driven (by drive means not shown) in a left lateral direction 68 in opening 76, while separator device 44B can be driven in a right lateral direction 70 in opening 78, and thereby allowing CD(T) to drop downward.

FIG. 2B also depicts how CD(T) could fall to a intermediate level or position 34 rather than falling onto the tray 12. This intermediate position 34 (see also FIGS. 1C and 1D) can be produced and (employed) by the presence (and action) of two CD holder ledges 80A and 80B that serve to hold CD(T) at such an intermediate level or position 34. When CD(B) is in this intermediate level or position 34, the elevated level or position 32 formerly occupied by CD(T) is free to receive and hold CD(B) as it is loaded into the drive 14 on the transport tray 12. The two CD holder ledges 80A and 80B also are respectively provided with lateral drive devices (not shown) that move ledge 80A to the left and ledge 80B to the right in the manner depicted by direction arrows 75 and 77 in order to lower CD (T) onto the tray 12. Preferably, this lowering is done by the force of gravity.

FIG. 2B illustrates how the ends 82 and 84 of tray 12 can each be slidably mounted on their respective vertical supports 72 and 74. In order to produce such a slidable mounting, each of the vertical supports 72 and 74 is shown respectively provided with a channel 86 (or 88) in which a downwardly projecting channel follower 90 (or 92) of the tray 12 are free to slide. Thus the vertical supports 72 and 74 are fixed and the tray 12 is free to move laterally with respect to them in the manner generally depicted by FIGS. 1A to 1D. The transport tray 12 can be moved into or out of the device 14 by a transmission having a motor driven pinion gear 94 whose gear teeth engage a rack 96 that forms a part of the tray 12. Thus, as the pinion gear 94 rotates in one direction, the rack 96 (and the tray 12 to which the rack 96 is attached) is driven in one lateral direction (e.g., in direction 16(i) of FIG. 1B). Conversely, when the pinion gear 94 is rotated in the opposite direction, the rack 96 is driven in the opposite lateral direction (e.g., in direction 16(o) of FIG. 1C). FIG. 2B also shows how a opto/electromagnetic communication device 24A can be positioned to transmit energy through the opening 22 in the tray 12 and on to the bottom surface of a CD such as CD(B) residing in the depression 38 in said tray. A spindle 98 driven by a motor (not shown) is shown engaged with a center hole 100 of CD(B) (e.g., in a compression fit of the type well known to this art) and thereby providing a means for rotating a CD (e.g., CD(B)) attached to said spindle.

FIG. 3 is a top plan view of the CD drive 14 shown in FIG. 2A. It shows the slidable, disk transport tray 12 on which the two compact disks (CD(T) and CD(B)) can be placed for loading and unloading the CDs in to and out of the drive 14. CD(T) is shown residing above CD(B) in the manner shown in FIG. 2B. FIG. 3 also shows the tray 12 (and CD(B) which rests on it) in a fully extended position such as that shown in FIG. 1C). Thus, the tray 12 and CD(B) shown in FIG. 3 depict the situation where CD (B) is about to be exchanged with CD(T). To this end, the disk transport tray 12 and CD(B) are driven (by the action of the rack 96 and pinion 94 transmission previously described), in the direction of arrow 16(o) to the tray's fully extended position. Again, such lateral movement is made possible by the fact that the left channel follower 90 depicted in FIG. 2B is free to slide in left channel 86 and right channel follower 92 is free to slide in right channel 88. In the fully extended position of the tray 12 depicted in FIG. 3, CD(B) is clear of the drive housing 54 so that the compact disk(s) carried by the disk transport tray 12 can be easily manually loaded and unloaded to and from the tray 12.

Finally, those skilled in this art will appreciate that various changes in this invention may be made without departing from its spirit and scope. Hence, the invention is limited only by the claims given below.

I claim:

1. A method for exchanging the positions of a first CD with a second CD in a CD drive, said method comprising:
    (1) stacking the first CD and the second CD on a disk transport tray;
    (2) inserting the disk transport tray (and the first and second CDs stacked on it) in a CD drive;
    (3) separating the first CD from the second CD within the CD drive;
    (4) performing a read/write operation on the first CD;
    (5) transporting the first CD out of the CD drive;
    (6) lowering the second CD;
    (7) inserting the first CD back into the CD drive such that it occupies a position formerly occupied by the second CD;
    (8) placing the second CD in a position formerly occupied by the first CD;
    (9) performing a read/write operation on the second CD; and
    (10) transporting both CDs out of the CD drive.

2. The method of claim 1 wherein the separating of the first CD from the, second CD is brought about by use of a wedge-shaped CD separator.

3. The method of claim 1 wherein the separating of the first CD from the second CD is brought about by use of a wedge-shaped CD separator and wherein said wedge-shaped CD separator also serves as a holder for the second CD.

4. The method of claim 1 wherein the lowering of the second CD is accomplished by dropping the second CD on to the first CD in a stacked relationship and withdrawing the transport tray, and the first and second CDs resting upon it, out of the CD drive.

5. The method of claim 1 wherein the lowering of the second CD is accomplished by dropping said second CD to an intermediate position and then dropping it on to the tray.

6. The method of claim 1 wherein the first CD contains information and the second CD is blank.

7. The method of claim 1 wherein both the first CD and the second CD are each blank and wherein a CD drive contains information that can be written on either of the two blank CDs.

8. The method of claim 1 wherein both the first CD and the second CD each contain data.

9. A method for duplicating information on a first CD onto a second CD, said method comprising:
   (1) placing a first CD, having information on its underside, upon a CD transport tray having an opening which permits the underside of the first CD to be in opto/electromagnetic communication with an opto/electromagnetic communication device in a CD drive;
   (2) stacking upon the first CD, a second CD having blank regions on its underside for receiving opto/electromagnetic communication from the opto/electromagnetic communication device in the CD drive;
   (3) inserting the CD transport tray, and the first and second CDs stacked upon it, into the CD drive;
   (4) separating the second CD from the first CD in the CD drive and holding the second CD in an upper position above the first CD;
   (5) reading information from the first CD and storing said information in a CD hard drive;
   (6) withdrawing the CD transport tray, and the first CD resting upon it, out of the CD drive;
   (7) lowering the second CD to a position such that the first CD can occupy the upper position formerly occupied by the second CD;
   (8) placing the second CD on the CD tray in the upper position formerly occupied by the first CD;
   (9) writing information that was read from the first CD, and stored in the CD drive, on a blank region of the second CD; and
   (10) removing the first and second CDs from the tray.

10. The process of claim 9 wherein the separating of the second CD from the first CD is brought about by use of a wedged-shaped CD separator.

11. The process of claim 9 wherein the separating of the second CD from the first CD is brought about by use of a wedge-shaped CD separator and wherein said wedge-shaped CD separator serves as a holder for the second CD.

12. The method of claim 9 wherein the lowering of the second CD is accomplished by dropping the second CD on to the first CD in a stacked relationship and withdrawing the CD transport tray, and the second and first CDs resting upon it, out of the CD drive.

13. The method of claim 9 wherein the lowering of the second CD is accomplished by dropping said second CD to an intermediate position and then dropping it on to the tray.

14. A CD exchange apparatus for a CD drive, said apparatus comprising:
   (1) a CD transport tray capable of holding a first CD in a stacked relationship with a second CD;
   (2) a separator capable of separating the first CD from the second CD within the drive;
   (3) a holder for holding the second CD above the first CD in the drive; and
   (4) a CD drop mechanism for dropping the second CD to a lower level so that the first CD can occupy a position formerly occupied by the second CD.

15. The CD exchange apparatus of claim 14 wherein the separator device is a wedge-shaped separator.

16. The CD exchange apparatus of claim 14 wherein the separator is a wedge-shaped CD separator that also serves as a holder for the second CD.

17. The CD exchange apparatus of claim 14 that further comprises an intermediate level CD holding device.

* * * * *

UNITED STATES PATENT AND TRADEMARK OFFICE
CERTIFICATE OF CORRECTION

PATENT NO. : 6,452,893 B1
DATED : September 17, 2002
INVENTOR(S) : Mark A. Wahl

It is certified that error appears in the above-identified patent and that said Letters Patent is hereby corrected as shown below:

Column 8,
Line 66, delete "the," and insert therefor -- the --
Line 49, delete "(and" and insert therefor -- and --
Line 50, delete "it)" and insert therefor -- it --

Column 9,
Line 12, before "tray" insert -- transport --
Line 16, delete "CD" and insert therefor -- hard --
Line 40, after "a" delete "CD"

Column 10,
Line 1, before "tray" insert -- transport --
Line 4, delete "stored in the CD drive" and insert therefor -- stored in the hard drive --
Line 23, before "tray" insert -- CD transport --
Line 30, delete "the drive;" and insert therefor -- the CD drive; --
Line 32, delete "in the drive" and insert therefor -- in the CD drive --
Line 38, after "separator" delete "device"

Signed and Sealed this

Fourth Day of January, 2005

JON W. DUDAS
*Director of the United States Patent and Trademark Office*